United States Patent [19]
Pierpoline

[11] Patent Number: 5,518,610
[45] Date of Patent: May 21, 1996

[54] OIL-WATER SEPARATION

[75] Inventor: Mario Pierpoline, Rose Tree, Pa.

[73] Assignee: Triton Environmental Corporation, Lancaster, Pa.

[21] Appl. No.: 385,052

[22] Filed: Feb. 7, 1995

[51] Int. Cl.⁶ .................................................. C02F 1/40
[52] U.S. Cl. ..................... 210/104; 210/115; 210/519; 210/540; 210/DIG. 5
[58] Field of Search ..................... 210/519, 532.1, 210/538, 540, DIG. 5, 104, 112, 115

[56] References Cited

U.S. PATENT DOCUMENTS

| | | | |
|---|---|---|---|
| 3,957,638 | 5/1976 | int'd Veld | 210/104 |
| 4,038,186 | 7/1977 | Potter et al. | 210/519 |
| 4,802,978 | 4/1989 | Schmit et al. | 210/540 |
| 4,938,878 | 7/1990 | Hall | 210/532.1 |
| 5,023,082 | 6/1991 | Schweizer et al. | 210/DIG. 5 |
| 5,304,303 | 4/1994 | Kozak III | 210/540 |

Primary Examiner—Christopher Upton
Attorney, Agent, or Firm—Robert S. Lipton; Lipton & Stapler

[57] ABSTRACT

An oil-and-water mixture is supplied to a tank which is closed at the bottom and open at the top, generally midway between top and bottom. A closed vessel envelops the upper portion of the tank. A vacuum is drawn at the top of the tank and vessel. An oil coalescer is placed between the mixture supply and the open tank top and a water coalescer between the supply and the closed tank bottom. Separated oil spills over the open tank top into the vessel, and is discharged from there. Separated water is discharged from the closed tank bottom.

10 Claims, 2 Drawing Sheets

OIL-WATER SEPARATION

BACKGROUND OF THE INVENTION

The present invention relates to separation of oil and water and particularly to equipment and techniques for accomplishing such separation in an efficient and effective manner.

There are many sources of oil-and-water mixtures in the industrialized world. These include prominently automobile service stations, where oil is frequently spilled and then contaminated with water during clean-up. Likewise oil soaked rags are washed in water, again resulting in an oil-and-water mixture. Another major source is the clean-up of the interiors of oil storage tanks and oil transport trucks. The resulting substances are no longer permitted to be discharged into sewers, or streams. Rather, they must be collected and then purified, by removing essentially all the oil before disposing of the water. The separated oil is then preferably recycled, thereby actually deriving some value from what would otherwise be waste.

Various techniques have been proposed for accomplishing the desired separation, but these have left something to be desired, from the standpoint of effectiveness, efficiency, controllability, or flexibility.

BRIEF DESCRIPTION OF THE INVENTION

Accordingly, it is an object of the present invention to provide an oil-water separation technique which is free from one or more of the shortcomings of the prior art.

This and other objects of the invention which will appear are accomplished as follows.

A generally vertical tank is provided within which the desired separation takes place. The oil-and-water mixture to be separated is introduced into this tank about mid-way between top and bottom. Above the mixture introduction level there is located an upper porous structure which is both oleophilic and hydrophobic. Below the mixture introduction level, there is located a lower porous structure which has the inverse properties, namely which is both hydrophilic and oleophobic.

The above mentioned properties of the upper porous structure promote the inherent tendency of the oil droplets in the mixture present above the introduction region to rise within the tank, while simultaneously promoting the inherent tendency of the water to not rise. Conversely, the properties of the lower porous structure promote the inherent tendency of the water below the mixture introduction region to descend, while simultaneously promoting the inherent tendency of the oil to rise.

Since oil is lighter than water, there is, as noted above, an inherent tendency for the mixture introduced into the tank to separate into those two components, with the oil rising to the top and floating on the water. However, this inherent tendency is slow-acting and would not suffice for the processing of industrial size quantities.

In accordance with the present invention, the upper and lower porous structures, further assisted by other features described below, accelerate the process to a practical degree.

Specifically, as the introduced mixture penetrates the upper porous structure, its oleophilic property attracts the oil droplets in the mixture and causes them to coalesce into larger entities, which therefore rise more rapidly. On the other hand, its hydrophobic property essentially repels the water droplets in the mixture and causes them to descend more rapidly, in countercurrent to the oil.

Below the mixture introduction region, in the absence of the lower porous structure, there would still be some oil droplets entrained by the downward movement of the water component. However, as this substance now penetrates that lower porous structure, its hydrophilic property will essentially promote the downward passage of the water component, while its oleophobic property repels the residual oil droplets and promotes their upward movement in the tank.

In accordance with the present invention, a vacuum is drawn at the top of the tank. This creates the suction for drawing the oil-and-water mixture into the tank and also provides the operating pressure drops across the upper and lower porous structures.

The interface level within that tank between the separated oil and water is maintained substantially constant, preferably just below the top of the upper porous structure, by controlling a pump which discharges accumulating water at or near the bottom of the tank. The accumulating oil, on the other hand, is permitted to spill over the top of the tank into an annular trough, from which it is discharged by another pump.

BRIEF DESCRIPTION OF THE DRAWINGS

For further details, reference is made to the discussion which follows, in light of the accompanying drawings, wherein.

The same reference numerals are used in both figures to designate corresponding elements.

DETAILED DESCRIPTION

Figure 1:
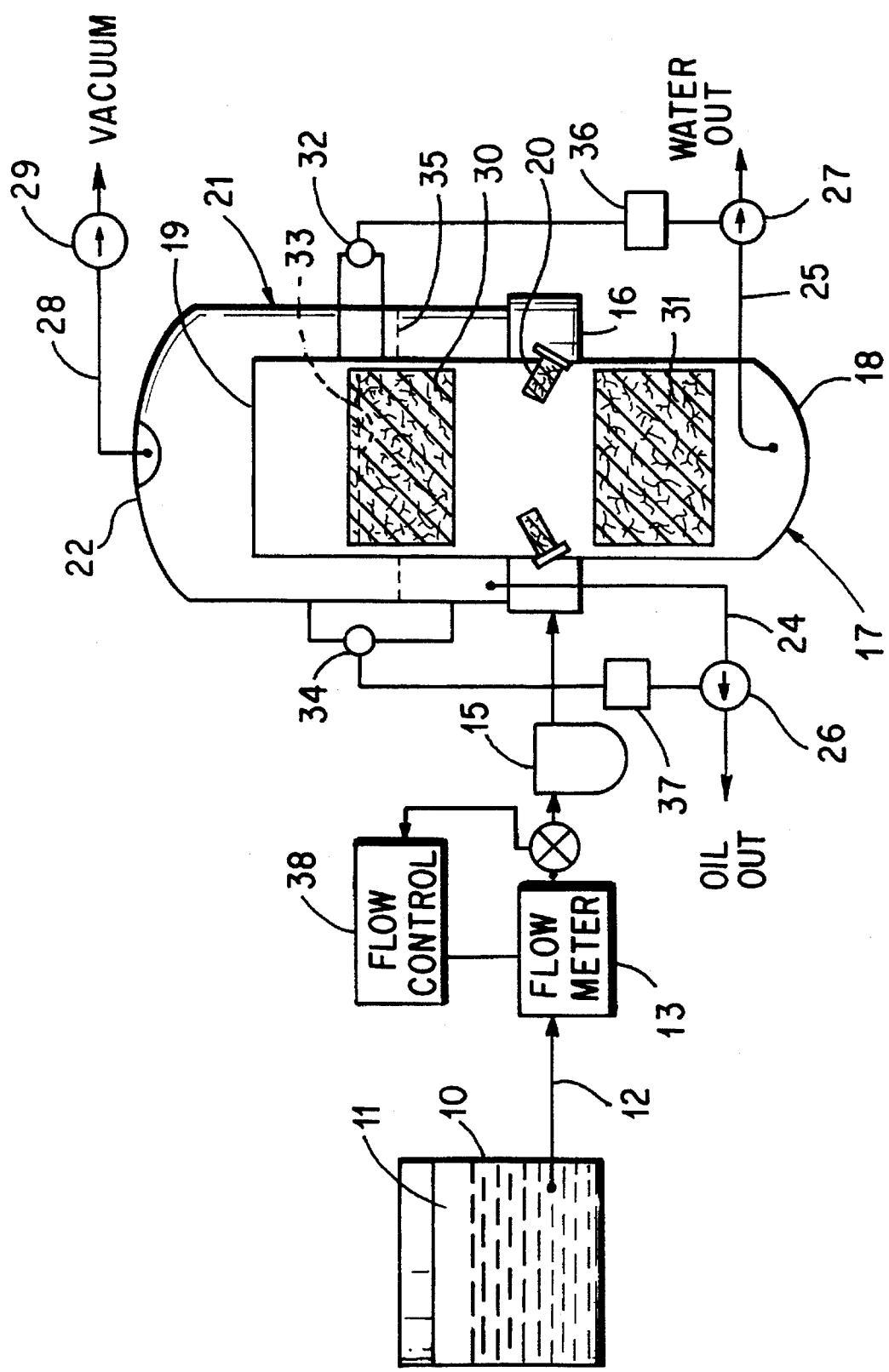
FIG. 1 is highly diagrammatic representation of overall equipment embodying the invention.

Referring to FIG. 1, this shows a reservoir 10 which contains the oil-and water mixture 11 that is to be separated. A pipe 12, which extends into the mixture 11, leads to a flow meter 13, a controllable valve 14, a filter arrangement 15, and finally into a plenum 16.

That plenum, or manifold 16 is donut shaped and surrounds a substantially vertical, generally cylindrical tank 17, approximately midway between the top and bottom of the tank.

Tank 17 has a closed bottom 18, and an open top 19. A plurality of nozzles 20 extend from plenum 16 into tank 17. Extending above and encircling tank 17 is another generally cylindrical vessel 21, which is closed at both top 22 and bottom 23.

Outlet pipes 24 and 25 extend outwardly from vessel 21 and from the bottom of tank 17, respectively. Pipe 24 leads past a pump 26, and pipe 25 leads past a pump 27. A third pipe 28 extends out from the top 22 of vessel 21 and leads past a vacuum pump 29.

Within the portion of tank 17 above plenum 16, there is a porous structure 30. Below the plenum there is a porous structure 31. In each case, the porous nature of the structure is diagrammatically indicated by cross-hatching. The upper porous structure 30 is made of material which is both hydrophobic and oleophilic (i.e. water repellent and oil attracting).

Conversely, the lower porous structure 31 is made of material which has the opposite properties, namely it is both hydrophilic and oleophobic.

In operation, a vacuum is drawn by pump 29 in the top of vessel 21 and tank 17. This is used at start-up to fill tank 17 with water to a level 33 discussed below. Thereafter, the vacuum causes mixture from reservoir 10 to flow into tank 17 via pipe 12, plenum 16 and nozzles 20. As this introduction of mixture continues, the oil and water will separate, with oil rising in the tank and water descending.

A sensor 32 is provided for detecting the level of the interface between the separated oil and water, which is indicated by broken line 33 in FIG. 1. The preferred location of this interface 33 is just below the top of upper porous structure 30. In this way, almost all the upper porous structure is submerged in water, with the top portion submerged in oil. As more and more separated oil accumulates, it will eventually reach the open top 19 of tank 17 and spill over that top into encircling vessel 21.

Another sensor 34 is provided for detecting the level of the spilled-over oil which has thus accumulated in vessel 21. An appropriate level for that oil is indicated by broken line 35 in FIG. 1.

Sensor 32 responds to deviations in the oil-water interface 33 from its desired level to control the pumping rate of pump 27 via water pump control 36. If the interface level 33 rises, the pump 27 will be speeded up, thereby discharging water more rapidly and lowering the interface level. If the interface level 33 descends, the pump 27 will be slowed down, thereby discharging water more slowly and allowing the interface level to rise.

Sensor 34 responds to deviations in the oil level 35 to similarly cause oil pump control 37 and pump 26 to maintain that level 35. This level 35 is relatively uncritical, except that it should not rise above the open top 19 of tank 17, and should preferably remain substantially below that open top.

Vacuum pump 29 can operate continuously and does not need any particular control as to the degree of vacuum which it maintains. This vacuum should simply be sufficient to draw the necessary mixture into the tank 17 and to create and maintain, in that tank, the column of liquid described above. For the illustrative case of an overall assembly of tank 17 and vessel 21 which is, say, 10 feet in height and 24 and 32 inches, respectively, in diameter, a vacuum of 25 to 27 inches Hg would be appropriate.

As for pipe 12, this is preferably kept filled and at a constant flow rate at all times. It is to that end that flow meter 13 measures the flow in the pipe and, via flow control 38 and valve 14, maintains that condition.

Filter 15 is provided for the purpose of removing unwanted solids (dirt and other contaminants) from the mixture before its introduction into tank 17. This prevents such material from clogging porous structures 30 and 31 and thereby interfering with efficient oil-water separation.

It will be recognized that the individual elements of the overall system embodying the invention may be of conventional construction and functioning.

That is true of all the pumps, pump controls, flow meter, flow control, filter, and level sensors. The latter, for example, may be conventional sensors such as sold by Omega Instrument Co. for detecting the level at which different fluids meet. Filter 15 is preferably a so-called Cuno filter which is self-cleaning and therefore does not require stopping the flow of mixture when clean-out is performed.

Special attention is directed to the upper and lower porous structures 30 and 31.

These perform a very important function, in that they substantially enhance the throughput of the equipment, and also the purity of the separated components. The details of the phenomena by which they accomplish this are quite complicated and it is desired to not commit to a precise explanation at this time. However, the following can be said in a way that is general and qualitative, rather than detailed and quantitative.

Each porous structure is made of filamentary material which is woven or knitted into a mat-like configuration, roughly resembling the structure of mesh filters, such as are used for example in conventional mist eliminators (also known as demisters). However, in the present case, these mat-like structures are thicker than in conventional demisters. For example, the upper porous structure 30 used inside tank 17 of FIGS. 1 and 2 would be about 18" thick (i.e. high) and the lower structure 31 about 24" thick.

The upper structure 30 is given its hydrophobic-oleophilic properties by being made of filamentary material having a surface of a substance such as Teflon. The lower structure 31 is given is hydrophilic-oleophobic properties by being made of filamentary material having a glassy or ceramic surface.

In any event, such structures are commercially available from a company named AMISTCO, 23221 W. Hwy 6, Alvin, Tex. 77511. From that company there can be obtained such structures to essentially any desired specifications, in terms of diameter, height, packaging, density of packing of the filamentary material and resulting porosity, as well as its philic or phobic properties.

Stated in general terms, what happens in upper porous structure 30 is that the passage of the oil-water mixture upwardly through that structure causes oil droplets to coalesce due to the oleophilic property of the material, and therefore to rise more rapidly through the structure than would otherwise be the case. On the other hand, its hydrophobic property causes the water droplets to be, so to speak, repelled, and in effect prevented from accompanying the oil droplets as the latter rise to the top of the structure 30.

Again stated in general terms, in the lower porous structure 31, the inverse effect takes place. That is, water droplets descending through that structure tend to coalesce due to its hydrophilic property. On the other hand, such oil droplets as are still present at that location are, so to speak, repelled by its oleophobic property and are thereby disassociated from the water and enabled to rise more readily toward the top of tank 17.

These coalescing effects provided by porous structures 30 and 31 substantially enhance the rate of separation—and therefore the volume of liquid which can be treated in any given time interval. It also yields purer separated components. So much so, that the separated water generally meets governmental requirements for direct discharge into streams.

Another assist to separation is provided by the particular construction of nozzles 20. As indicated by cross-hatching in both FIGS. 1 and 2, the portions of these nozzles which project into tank 17 are formed of fine wire mesh, preferably coated with Teflon. This also creates a coalescing tendency in the oil component as it, so to speak, oozes out through these mesh nozzles into tank 17. Also, these nozzles are tilted upwardly, so that the water component can immediately start to descend downwardly, in the opposite direction to the oil component's upward movement.

Preferably, there are several such nozzles, e.g. six, distributed around the periphery of the tank 17. This makes the velocity of the mixture more uniform and prevents turbulence, which can detract from separation speed and completeness.

Pressure reduction at the nozzles also contributes to separation.

The vacuum applied at the top also provides the opportunity for gases dissolved in the mixture to be released.

Figure 2:
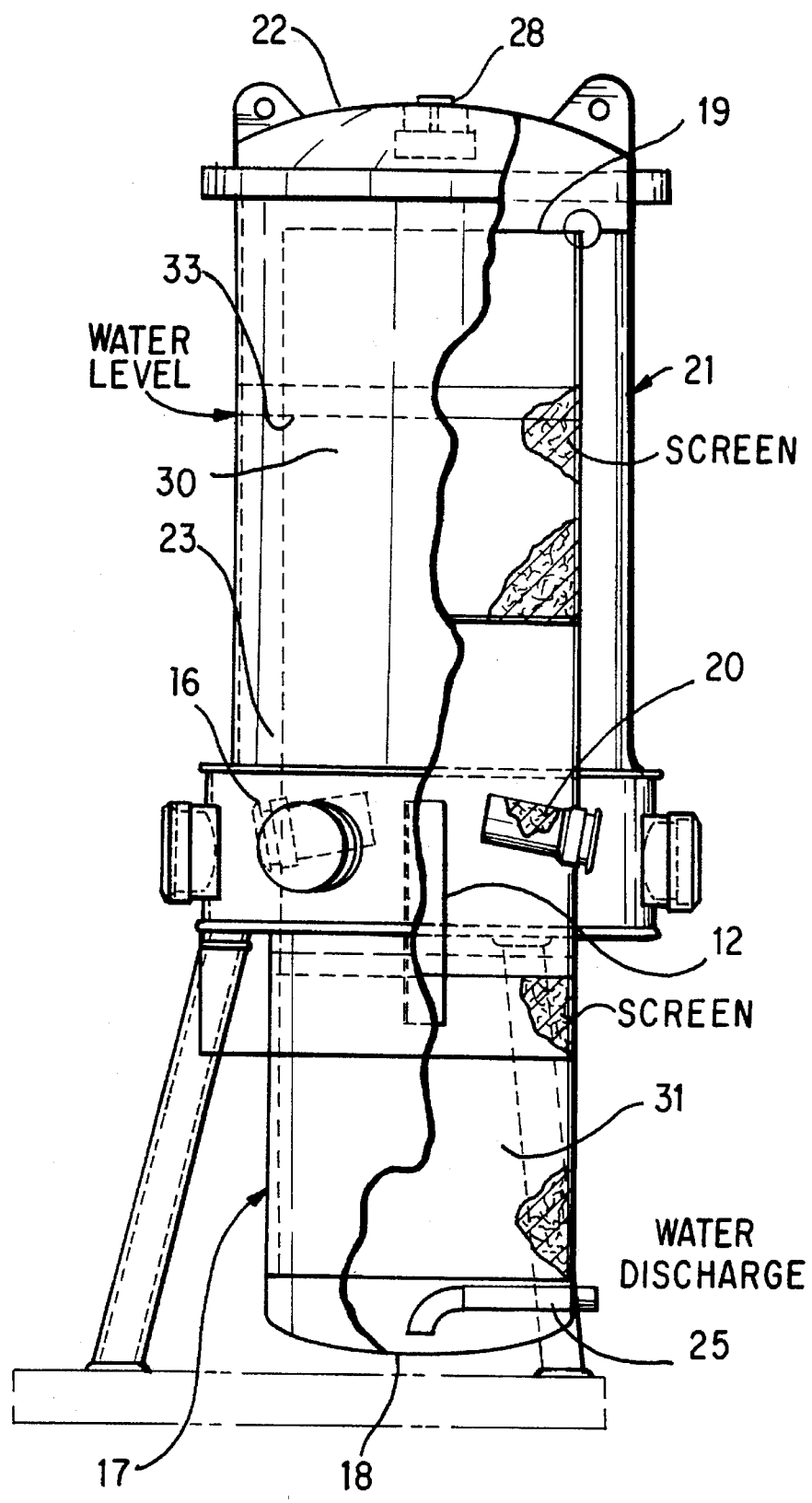
FIG. 2 is a more detailed representation of that portion of the equipment in which the actual separation takes place.

FIG. 2 shows, still in diagrammatic form, but in somewhat more detail and with representative dimensions, the structure of the tank and vessel represented in FIG. 1. As can be seen from the dimensions, the equipment embodying the invention can readily be transported by trailer truck. This is an important feature, because in practice it is often desirable to bring the separating equipment to the location where large quantities of the mixture originate, rather than the other way around.

It will be understood that many variations in detail may be made without departing from the inventive concept.

For example, it may be desirable to lower the viscosity of the mixture before introducing it into tank 17 so as to make it quite liquid. To that end, the reservoir 10 may be preceded by a heater (not shown) in which steam heat is used in a heat exchanger to warm the mixture before it reaches reservoir 10 and hence the tank 17. Low viscosity facilitates the transport of the oil into and through tank 17 and increases the effectiveness of the separation.

Also, if the original mixture contains significant solids (dirt or other contaminants), the mixture preferably passes through a strainer (not shown) before introduction into reservoir 10, and also preferably before the heat exchanger mentioned above. This strainer would be in addition to the filter 15 between flow meter 13 and plenum 16.

As another example, mixtures of liquids having different specific gravities other than oil and water can be processed by the technique described herein, with appropriate adjustment of the philic and phobic properties of the coalescing elements (nozzles 20 and porous structures 30 and 31). Accordingly, it is desired to limit the scope of the invention only by the appended claims.

I claim:

1. Apparatus for separating oil and water from a mixture thereof comprising:

a generally vertical tank closed at the bottom and open at the top;

means for introducing said mixture into said tank generally midway between said top and bottom;

a closed vessel surrounding a portion of said tank above said mixture introducing means, vertically spaced above the open end of said tank and horizontally spaced from the sidewalls of said tank;

means for drawing a vacuum in the top of said vessel and tank;

means located between said mixture introducing means and said open tank top for promoting the coalescing of oil droplets;

means located between said introducing means and said closed tank bottom for promoting the coalescing of water droplets;

means for collecting and discharging oil which spills over said open tank top into the horizontally spaced portion of said vessel; and means for discharging water from said closed tank bottom.

2. The apparatus of claim 1 wherein the oil coalescing means comprises a porous structure having both oleophilic and hydrophobic properties; and the water coalescing means comprises a porous structure having both oleophobic and hydrophilic properties.

3. The apparatus of claim 2 wherein each of said porous structures comprises a mat-like assembly of woven or knitted filaments.

4. The apparatus of claim 1 further comprising means for maintaining the level of the interface between the separated oil and water close to but below the top of said oil coalescing means.

5. The apparatus of claim 4 herein said level maintaining means comprises means for varying the rate of said water discharge.

6. The apparatus of claim 1 further comprising means for maintaining the level of said spilled-over oil substantially below said open tank top.

7. The apparatus of claim 6 wherein said oil level maintaining means comprises means for varying the rate of said oil discharge.

8. The apparatus of claim 1 wherein said mixture introducing means includes at least one nozzle projecting into said tank and supplied with said mixture.

9. The apparatus of claim 8 wherein said at least one nozzle is made of a mesh-like material in the portion projecting into the tank, and said material is both oleophilic and hydrophilic, at least on its surface.

10. The apparatus of claim 9 wherein said at least one nozzle is tilted upwardly at an acute angle.

\* \* \* \* \*

UNITED STATES PATENT AND TRADEMARK OFFICE
CERTIFICATE OF CORRECTION

PATENT NO. : 5,518,610
DATED : May 21, 1996
INVENTOR(S) : Mario Pierpolini

It is certified that error appears in the above-indentified patent and that said Letters Patent is hereby corrected as shown below:

Column 6, line 28, the word "herein" should be replaced with the word --wherein--

Signed and Sealed this

Sixth Day of August, 1996

*Attest:*

BRUCE LEHMAN

*Attesting Officer*     Commissioner of Patents and Trademarks